United States Patent Office 3,165,017
Patented Jan. 12, 1965

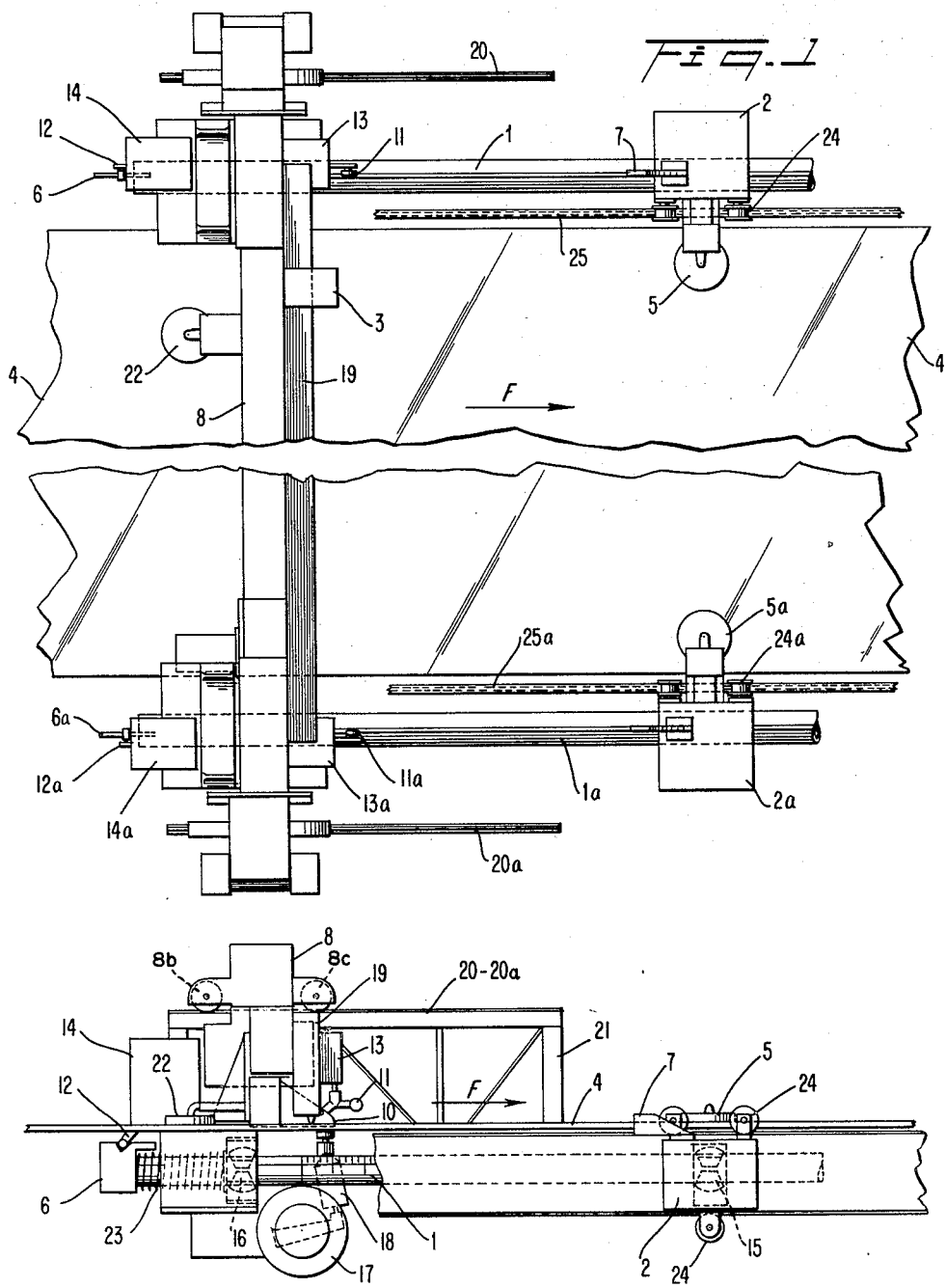

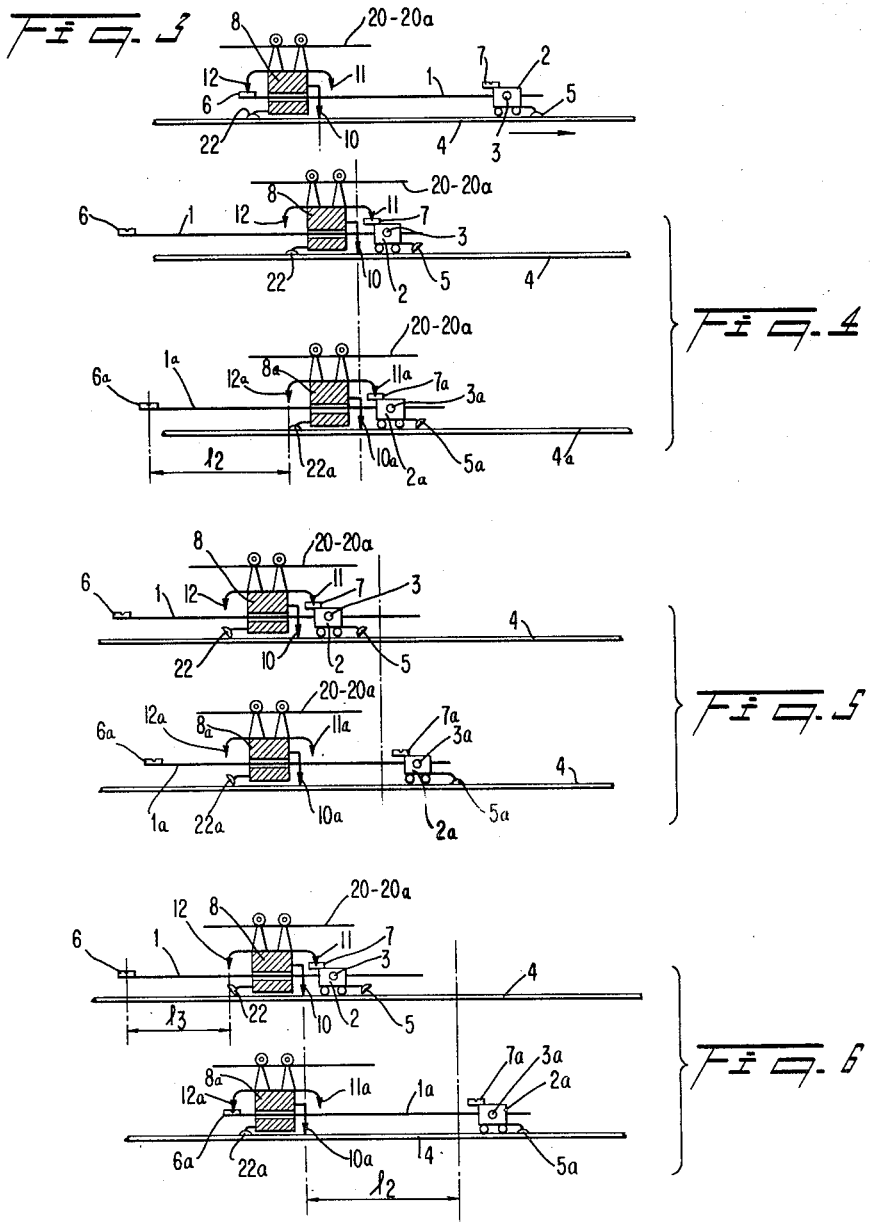

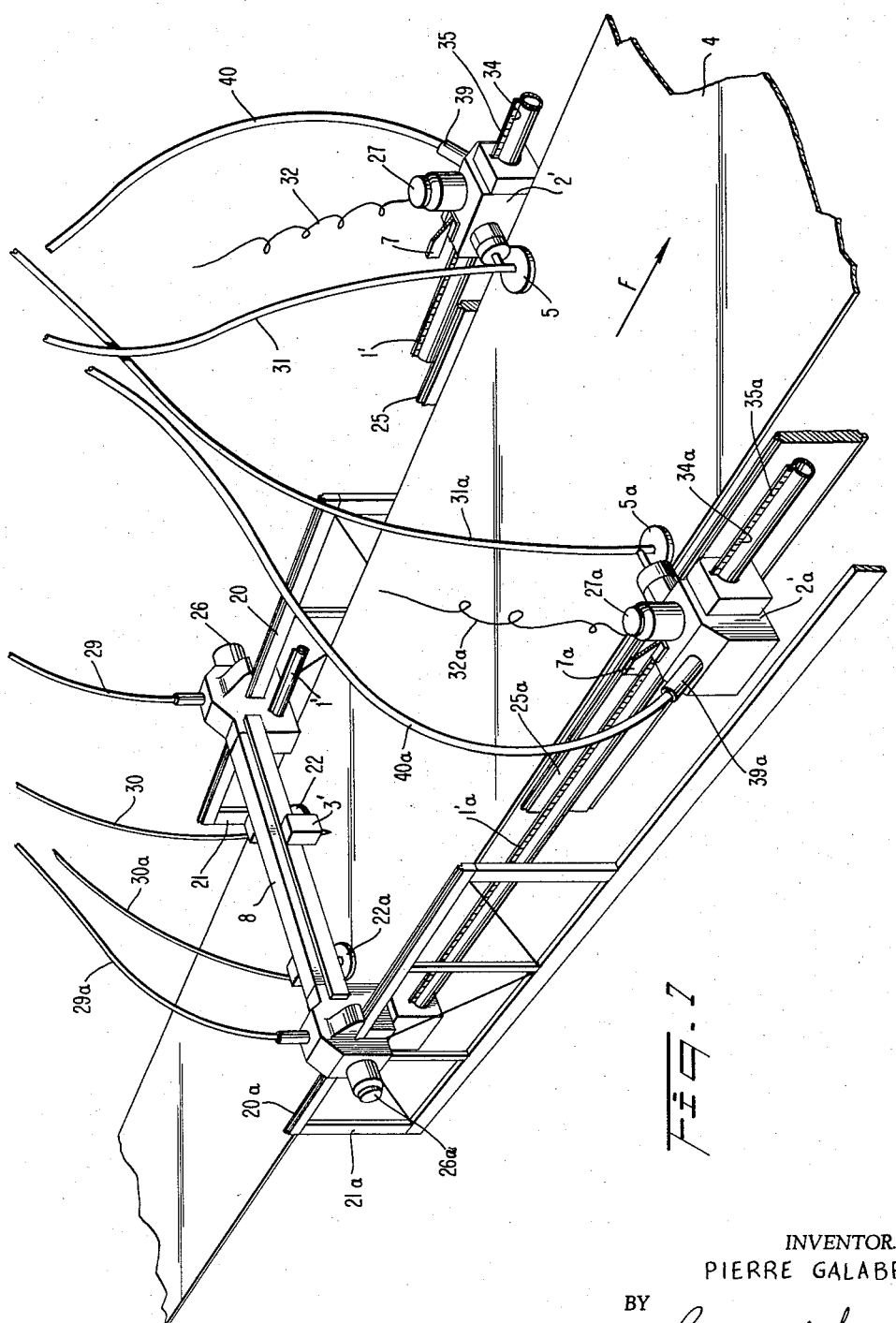

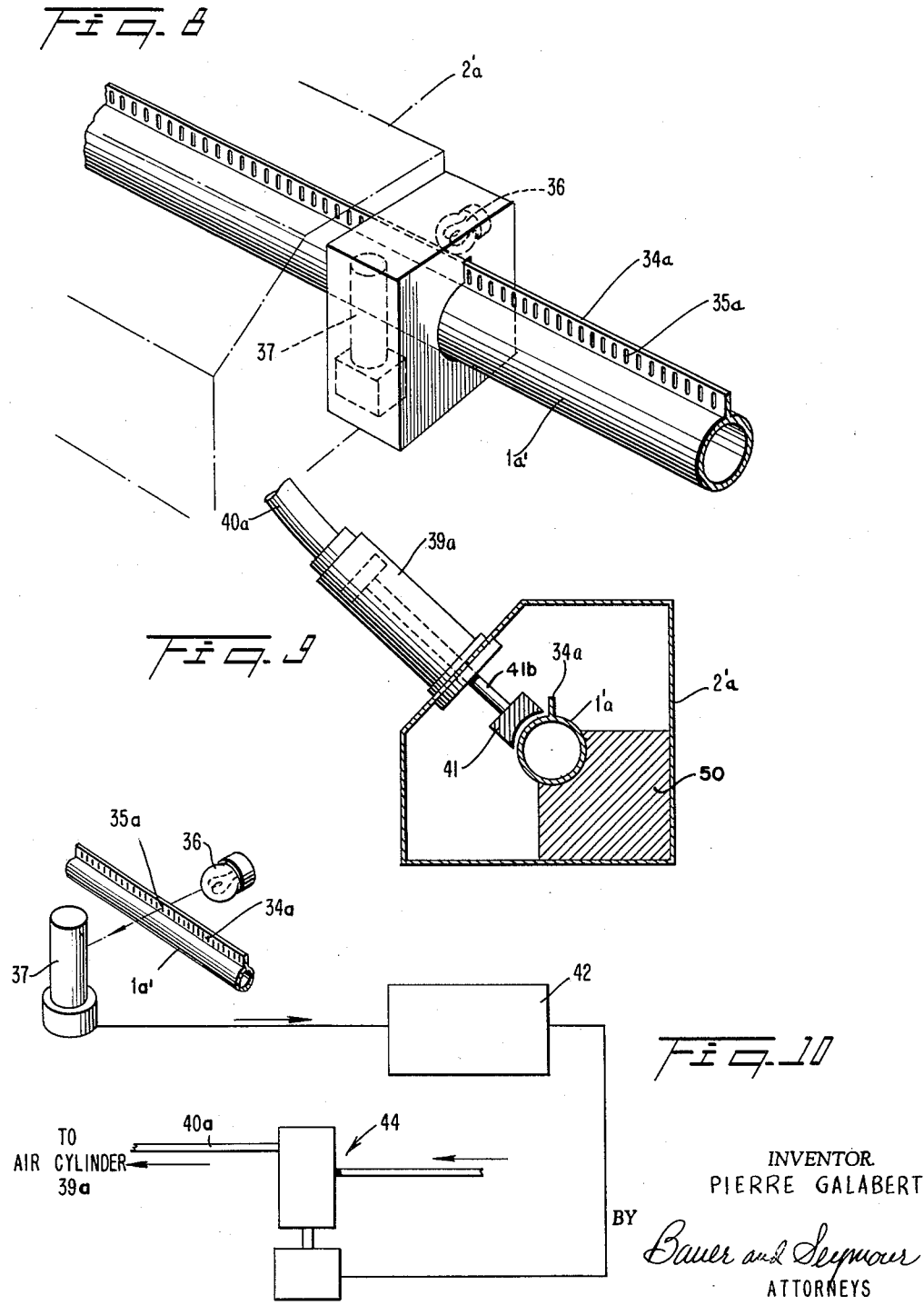

3,165,017
METHOD AND APPARATUS FOR AUTOMATI-
CALLY CUTTING A STRIP OF GLASS
Pierre Galabert, Rueil-Malmaison, France, assignor to
Compagnie de Saint-Gobain, Neuilly sur Seine, France
Filed July 16, 1962, Ser. No. 209,890
19 Claims. (Cl. 83—7)

This invention relates to an apparatus for and a method of cutting a sheet of glass into pieces. The invention has particular advantages in connection with the cutting of a strip of glass travelling in the direction of its length into sections of definite lengths. The invention is applicable to the cutting of plates and sheets or tubes of all materials, metallic, organic and vitreous.

This application discloses an improvement upon the invention disclosed in application Serial No. 36,036, filed June 14, 1960, assigned to the same assignee.

The invention disclosed in application Serial No. 36,036 provides an automatic apparatus and method for cutting into sections of predetermined lengths each, a continuously moving sheet or ribbon of glass. Such method consists in using, associated with an automatic system for tracing lines of cut upon the glass, a graduated rule which travels with the ribbon of glass. Upon such rule there are graduation marks by which the length of glass to be cut may be determined.

In a preferred embodiment of the apparatus disclosed in application Serial No. 36,036, provided for carrying out such method, there is employed a bridge disposed transversely of the ribbon of glass, such bridge being provided with a glass cutting or line tracing tool. The rule is temporarily and releasably affixed to the ribbon of glass to travel therewith by means of carriage. The rule is in such embodiment in the form of a tube having a carriage releasably fixed to one end for adjustment therealong, so that the rule travels with the carriage as the latter travels with the glass. The other end of the rule is provided with a cam by means of which it may be affixed to the bridge. Means are provided for releasably fixing the bridge to the glass ribbon. The cutting of the glass is carried out when the bridge is thus affixed to the glass.

If it is desired to change the length of the section of glass thus to be cut from the ribbon of glass, it is necessary to hold the rule fixed, to free the carriage from the ribbon of glass, to determine on the rule the new length of glass to be cut, and again to affix the carriage to the rule in a new position of adjustment therealong. Since the ribbon of glass continues to travel during the period required for such it may be necessary to make the next cut at a substantial distance from the preceding cut other than the desired new length of section, thus producing a piece of glass of an unwanted length, and resulting in a considerable waste of glass.

The present invention overcomes such difficulty. In accordance with the present invention, there are employed two independent graduated rules, each rule being associated with its own separate carriage in such manner that while one rule and carriage are being employed for cutting from the ribbon a piece of glass having a previously predetermined length, the other rule and its carriage may be adjusted for cutting at a later time a piece of glass having a different length.

As well as resulting in the saving of considerable time and glass, as mentioned above, the present invention, in a manner to be explained below, has the further advantage of permitting the cutting of glass panels having lengths exceeding the length of the individual rules, for example, multiples of such length, or lengths of intermediate values.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in plan of a first embodiment of an apparatus made in accordance with the present invention;

FIG. 2 is a fragmentary view in side elevation of a portion of the apparatus of FIG. 1, certain of the parts being shown in section and others of the parts being broken away for clarity of illustration;

FIG. 3 is a schematic view in side elevation of a portion of the apparatus of FIGS. 1 and 2, the apparatus being shown making a tranverse trace or cut in the glass ribbon, the cut being located by the use of only a first one of the measuring rules and its associated carriage with which the apparatus is provided;

FIG. 4 is a schematic view in side elevation of the apparatus of FIGS. 1 and 2, the cutting tool of such apparatus being shown positioned to cut a glass panel of length $l_2$ by the use of the second one of the measuring rules;

FIG. 5 is a schematic view in side elevation of the apparatus of FIGS. 1 and 2 with the parts in the positions which they may assume in a subsequent stage of the process of the invention;

FIG. 6 is a schematic view in side elevation of the apparatus of FIGS. 1 and 2 with the parts in the positions which they assume in making a cut $t_2$ located on the ribbon of glass by the rule $1a$, the rule $1$ being shown adjusted to permit the location of a subsequent cut at a distance $l_3$ from the cut $t_2$;

FIG. 7 is a fragmentary view in perspective of a second embodiment of glass cutting apparatus made in accordance with the invention;

FIG. 8 is a fragmentary view in perspective of a photoelectric scanning mechanism employed in the apparatus of FIG. 7 for determining the length of extension of a measuring rule from the bridge of the apparatus;

FIG. 9 is a view partially in elevation and partially in section of a rule-gripping mechanism mounted in a carriage associated with a rule of the apparatus of FIG. 7; and FIG. 10 is a schematic wiring diagram of the apparatus for controlling the mechanism of FIG. 9 by the mechanism of FIG. 8.

Turning now to the drawings, a first preferred illustrative embodiment of apparatus in accordance with the invention is shown in FIGS. 1 and 2. In such figures a strip of glass 4 is shown as being displaced to the right in the direction F. Strip 4 is supported as by rollers (not shown) during such travel. Tracks 25, 25a are disposed along respective side edges of the glass strip and parallel thereto. A carriage 2 is mounted for reciprocation along track 25 on rollers 24, as shown. A second carriage 2a which may be of the same construction as carriage 2, is mounted by rollers 24a for translation on and along track 25a at the other side of sheet 4. A graduated rule or scale 1 in the form of a tube is positioned laterally beyond and parallel to the strip of glass along one edge thereof, a similar rule or scale $1a$ being positioned laterally beyond and parallel to the strip of glass along the other edge thereof. The mechanisms associated with rules 1 and $1a$ are similar, those associated with scale $1a$ are designated by the same reference characters as those associated with rule 1 but with an added "$a$". A detailed description of rule 1 and the mechanisms associated therewith will suffice.

Rule 1 is mounted for sliding movement within carriage 2 on a roller guide 15, FIG. 2; the scale 1 can be locked in any desired position on carriage 2 by means of a setscrew 3 (FIGS. 1 and 3–6, inclusive). Mounted on rails 20, 20a extending along respective side edges of strip 4 and parallel to guides 25, 25a is a bridge 8 which extends transversely across glass strip 4. The rear end of scale 1 extends through one end of bridge 8 (the upper end in FIG. 1) and is slidingly mounted therein by a roller guide 16, FIG. 2. The left hand end of scale 1 carries an enlarged head or abutment 6, there being a shock absorbing coil compression spring 23 interposed between head 6 of the scale and the bridge 8.

The head 6 on rule 1 has a transversely extending V groove or notch 6a in its upper surface. Secured to the left hand edge of carriage 2 is a similar V-grooved block 7. Secured to the right and left hand edges of bridge 8, respectively, as viewed upon FIG. 1, are selectively operable locking bolts 11 and 12 which may be lowered in order to lockingly cooperate with the V-grooved members 7 and 6, respectively, or may be raised so that they are free from such members. The locking bolts may be operated pneumatically by conventional means 13, 14, respectively, so that bridge 8 can be locked either to scale 1 by means of the cam-bolt combination 6, 12 as seen in FIG. 2, or to the carriage 2 by means of the cam-bolt combination 7, 11 as seen in the upper portion of FIG. 4.

The pneumatic devices 13, 14 are jacks put into operation by adjoining electrically-operated valves and a switch or interrupter (not shown). Thus when the cam 7 of the carriage is about to be locked to bolt 11, the cam 7 touches the electrical interrupter which energizes the valve (not shown). Compressed air from a source (not shown) is thereby applied to jack 13 and the bolt is lowered into the root of the V-groove of block 7. The displacement of the carriage 2 in unison with the advancing strip of glass 4 is brought about by a suction disc 5 or a pad which overlies the glass 4 and may be selectively raised and lowered so as to be released from or connected to the glass strip 4. The return of the carriage 2 to bridge 8 is brought about by a wheel having a pneumatic tire 17. Such wheel may be swiveled into contact with or away from rule 1 by means of a pneumatic jack 18. When the wheel is pressed against rule 1 and is driven in a counterclockwise direction as viewed upon FIG. 2, the scale 1 and carriage 2 may be impelled rearwardly of the glass strip, assuming that the suction cup 5 has been released from the glass. In commercial installations of the apparatus, it is preferred that the controls of the pneumatic jacks 13, 14, and 18 be automatic and synchronized, so that the apparatus automatically repeatedly carries out the sequence of operations now to be described in connection in FIGS. 3–6, inclusive.

Bridge 8 carries a retractable suction disc or pad 22 which can either be lowered to connect the bridge to the strip of glass 4 to cause the two to travel together, or can be raised to disconnect the bridge from the strip of glass. As above noted, bridge 8 is guided for movement above and parallel to glass strip 4 by guide rollers 8b and 8c resting upon guide rails 20, 20a which are supported on opposite sides of the glass strip by supporting brackets such as that shown at 21 in FIG. 2. When bridge 8 is secured to carriage 2 by locking bolt 11 and grooved block 7, the bridge and carriage travel together. Bridge 8 is returned along scales 1 and 1a into contact with abutments 6, 6a thereof, by power means, not specifically shown. The above described helical spring 23 avoids mechanical shock when the bridge returns into final position and bolt 12 locks into the grooved element 6. The cutting tool or wheel 10 is mounted in a carriage 3' for travel along the length of bridge 8 by being mounted on suitable guide means running in a guideway 19 on the bridge.

The graduation of the scales or rule 1 and 1a is carried out as follows: The zero or 0 graduation is at a distance "a" from the axis of the notch of the respective grooved element 6, 6a. In the apparatus shown, this length "a" is the distance separating the bolts 12, 12a from the cutting wheel 10 measured in the direction of travel of sheet 4, so that in the position of the scale 1 shown in FIG. 3 the graduation zero or 0 of the scale 1 is aligned with the cutting wheel 10. Rule 1a is similarly graduated.

The apparatus of FIGS. 1 and 2 may be employed, by the use of one rule, such as rule 1, only, in the same manner as that disclosed in aforesaid application Serial No. 36,036. In FIG. 3, which corresponds to FIG. 5 in the application Serial No. 36,036, a cut $t_1$ is traced by the cutting tool 10. The lowered positions of the vacuum cup 22 of bridge 8 and 5 of carriage 2 indicate that such elements are affixed to the ribbon of glass and travel therewith during the time necessary for forming cut $t_1$.

The use of duplicate measuring scales 1, 1a, carriages 2, 2a, etc. at respective side edges of sheet 4, in combination with a single bridge 8, enables a much greater versatility than in an installation using but a single scale and carriage. For example, when carriages 2 and 2a are adjusted to the same reading on their respective scales 1 and 1a the invention can be used so that alternate cuts are made as measured, first by carriage 2 and scale 1, next by carriage 2a and rule 1a. Or, where alternate cuts of different lengths are to be made, carriage 2 is fixed to and along scale 1 for one of the lengths and carriage 2a is fixed to and along scale 1a for the other of the lengths, so that by first using scale 1 and carriage 2, and next, scale 1a and carriage 2a alternate cuts of the required different lengths of sheets may be made; and, of course, either carriage may be adjusted to a new length indication with respect to its scale, while the other is being used to make one or more cuts.

The operation is briefly resumed as follows:

The zero of each scale 1 and 1a is at the left end thereof as the parts are viewed upon FIGS. 1 through 6. In the case of scale 1, for example, its zero graduation lies in the intersection with said scale of a plane normal to the plane of FIG. 3 and passing through cutter 10, when the parts are in the relation shown upon this figure. From this zero mark, graduations extend on and along scale 1 to the right. Thus, any desired length of sheet is determined merely by loosening setscrew 3 of carriage 2, for example, and adjusting the carriage along and relatively to the scale until a pointer thereon, not shown, indicates the desired length of cut upon the scale. This pointer or index is, obviously, positioned in a second plane normal to the plane of FIG. 3 and intersecting the bottom of the V-notch in element 7. Carriage 2a is similarly set or fixed to and along scale 1a, except of course that its setting may be different from that of carriage 2.

Returning to carriage 2, a first cut is effected by movement of cutter 10 on and along bridge 8, as the bridge, carriages and scales move as a unit with the moving sheet and with the parts, for example, in the relation shown at FIG. 4. Carriage 2 is then affixed to the sheet by lowering of its pad or suction cup 5 and the bridge is freed from carriage 2 by raising bolt 11, and from the sheet by raising suction cups or pads 22, 22a.

Carriage 2 and scale 1 now move forward with the glass while the bridge is moved in retrograde translation, that is, in the direction opposite to that indicated by arrow F. FIG. 1, until it engages head 6 fixed to the left end of scale 1 and thereby causes lowering of bolt 12 into the notch of the head and lowering of pad or suction cup 22 into contact with the glass sheet.

The foregoing procedure describing operation of the device using but one rule and carriage, is repeated step-by-step as long as the length of glass sections to be cut remains unchanged. However, if there is to be a change in length of sections, this may be effected when the bridge and carriage are locked together, by loosening the set screw holding the carriage to its rule, and sliding the rule through and relatively to the bridge and carriage until the desired new length is indicated on the rule, by the index fixed with the carriage.

The addition of the second carriage 2a and rule 1a to the common bridge 8, effects new and useful results per se, and in combination with the semi-automatic photo-cell selector subsequently described. As an example, let it be assumed that it is required to cut alternate sheets to different lengths, say 3 feet and 4 feet. Referring to FIG. 4, let it be assumed that carriage 2a is set at the four-foot mark on its rule 1a and that carriage 2 is set at the three-foot mark on rule 1. It should be kept in mind that in FIGS. 4, 5 and 6, bridge 8 is the same identical bridge as that identified by 8a. This is clear from a comparison of FIGURES 4, 5 and 6, with FIGURE 7. In the latter figure, suction cups 22, 22a are shown carried by the same bridge and these cups also appear upon FIGS. 4, 5 and 6.

Starting with the parts as shown upon FIG. 4, both carriages 2 and 2a are locked to the bridge and suction cups 22, 22a are operative to attach the bridge directly to the glass ribbon. Cutter 10 is now operated to make a first cut. As indicated upon this figure, both suction cup 5 and 5a of carriages 2 and 2a, respectively, are out of holding contact with the ribbon of glass at this time.

Next, suction cup 5a is operated as indicated in FIG. 5 to secure carriage 2a to the glass ribbon and this carriage is then released from bridge 8 by release of locking bolt 11a, while carriage 2 remains locked to the bridge and, of course, its suction cup 5 is free of the glass. Suction cups 22 and 22a are now released to free bridge 8 from the glass and the bridge, rule 1, and carriage 2 are translated as a unit rearwardly, that is, to the left as the parts are viewed upon FIGS. 4, 5 and 6, along and with respect to rule 1a, until bolt 12a interengages with head 6a of this rule, as shown upon FIG. 6, to thereby position cutter 10a at exactly four feet rearwardly of the previous or first cut, that is, the distance identified at $l_2$, FIGS. 4 and 6. At this time, suction cups 22, 22a may be moved into holding contact with the glass and the cutter 10a operated to make the second cut precisely four feet from the previous one.

Next, suction cup 5 is attached to the glass while, approximately simultaneously, cup 5a is released and rule 1a and its carriage 2a are translated rearwardly to bridge 8 until bolt 11a engages 7a and locks the bridge and carriage 2a together. Now, with suction cups 22, 22a released from the glass and bolt 11 freed from carriage 2, interlocked bridge 8, rule 1a and carriage 2a, are translated as a unit relatively to and along rule 1 and the glass, until bolt 12 locks to head 6 to thereby position the cutter at exactly three feet rearwardly of the second cut, that is, the distance $l_3$ identified upon FIG. 6. Suction cups 22, 22a are again operated to fix the bridge to the glass, and the cutter is operated to make the third cut. Next, suction cup 5 is released from the glass and carriage 2 and its rule are translated rearwardly until bolt 11 locks to head 7 of the carriage, thereby restoring the parts to the positions shown upon FIG. 4.

The cycle just described, of course, requires much less time than is taken to describe it. Furthermore, this is but one of a large number of ways in which the apparatus may be usefully employed. Thus, the distances measured by rules 1, 1a, alternately, may be the same. Or, while a cut is being made as measured by one rule, the setting of the other carriage on and along its rule may be adjusted for a new length of section of glass to be measured and cut. Thus, for example, FIG. 5 shows the bridge, carriage 2 and rule 1 being translated rearwardly along rule 1a which, at this time is fixed to the glass by suction cup 5a. Thus, during this interval, set screw 3 may be released and rule 1 slid along and relatively to its carriage and the bridge and fixed to the carriage in a new setting for a new length of sheet section. This operation is facilitated, of course, by the semi-automatic photo-cell control of FIGS. 7 through 10.

Where a section of glass is required having a length greater than that of the effective length of either of the rules 1, 1a, it is merely necessary to adjust the carriages, each along its respective rule, until the sum of the indications on the rules equals the required length of glass section. Then the cycle just described is carried out except that the second cut of the described cycle is omitted. In an obvious way, the third cut of the described cycle will then be a distance from the first cut, equal to the sum of the distances indicated by the carriages 2, 2a, upon their respective rules. For example, in the cycle described, a glass section seven feet in length will be obtained when the aforesaid second cut is omitted.

In some instances it is desirable to cut a relatively short section of glass. For example, where the operator desires to cut out a relatively short section of glass containing a defect or imperfection he can temporarily adjust one rule, such as 1, FIG. 5, relatively to its carriage and the bridge, until member 6 will lie just rearwardly of the defect when bolt 12a interlocks with member 6a, so that the succeeding cut measured by rule 1 will remove the defect, with a minimum waste of glass.

As an example, let it be assumed that it is required to cut alternate sheets to different lengths of, say, 3 feet and 4 feet each. Referring to FIG. 4, let it be supposed that carriage 2a is set at the 4-foot mark on its rule 1a; and that carriage is set at the 3-foot mark on rule 1. It should be kept in mind that in FIGS. 4, 5 and 6, bridge 8 is the same identical bridge as that identified by 8a. This is clear from a comparison of FIGS. 4, 5 and 6, with FIG. 7. In the latter figure, suction cups 22, 22a are shown carried by the same bridge, and these cups also appear upon FIGS. 4, 5 and 6.

Starting with the parts as shown upon FIG. 4, both carriages 2 and 2a are locked to the bridge and suction cups 22, 22a are operative to attach the bridge directly to the glass ribbon. Cutter 10 is now operated to make a cut. As indicated upon this figure, both suction cups 5 and 5a of carriages 2 and 2a, respectively, are out of holding contact with the ribbon of glass at this time.

Next, suction cup 5a is operated as indicated in FIG. 5 to secure carriage 2a to the glass ribbon and this carriage is then released from bridge 8 by release of locking bolt 11a, while carriage 2 remains locked to the bridge and, of course, its suction cup 5 is free of the glass. Suction cups 22 and 22a are now released to free bridge 8 from the glass and the bridge, rule 1, and carriage 2 are now translated as a unit rearwardly, that is, to the left as the parts are viewed, upon FIGS. 4, 5 and 6 along and with respect to rule 1a, until bolt 12a interengages head 6a of this rule, as shown upon FIG. 6, to thereby position cutter 10a at exactly four feet rearwardly of the previous cut, that is, the distance identified at $l_2$, FIGS. 4 and 6. At this time, suction cups 22, 22a, may be moved into holding contact with the glass, and the cutter 10 operated to make the second cut precisely four feet from the previous one.

Next, suction cup 5 is attached to the glass, while, approximately simultaneously, cup 5a is released and rule 1a and its carriage 2a, are translated rearwardly relatively to bridge 8 until bolt 11a engages 7a and locks the bridge and carriage 2a together. Now, with suction cups 22, 22a released from the glass, and bolt 11 freed from carriage 2, interlocked bridge 8, rule 1a and carriage 2a, are translated as a unit relatively to and along rule 1 and the glass, until bolt 12 locks to head 6 to thereby position the cutter at exactly three feet rearwardly of the second cut, that is, the distance $l_3$ identified upon FIG. 6. Suction cups 22, 22a are again operated to fix the bridge to the glass, and the cutter is operated to make the third cut. Next, suction cup 5 is released from the glass and carriage 2 and its rule are translated rearwardly until bolt 11 locks to head 7 of the carriage, thereby restoring the parts to the positions shown upon FIG. 4.

A second embodiment of glass cutting apparatus in accordance with the invention is shown in FIGS. 7–10, inclusive. In such figures, parts which are similar to those in FIGS. 1–6, inclusive, are designated with the same reference characters as those employed in FIGS. 1–6. The transverse bridge 8 travels along tracks 20 and 20a, the bridge being selectively moved by being affixed to the glass 4 by suction heads 22 and 22a operated respectively by gearmotors 26 and 26a carried by bridge 8 as shown. The measuring rules are designated 1' and 1a', the ends nearer the observer as the parts are viewed upon FIG. 7 being supported by and slidable relatively to carriages 2' and 2a'. Such carriages travel along their own tracks 25, 25a, respectively, parallel to the edges of glass 4 by being secured to the glass by suction heads 5 and 5a, each under control of a respective one of motors 27 and 27a, mounted on the respective carriages. As indicated in FIG. 7, motors 26 and 26a are powered through flexible cables 29 and 29a, and motors 27 and 27a are powered through cables 32 and 32a, respectively. The suction heads 22, 22a carried by bridge 8 are exhausted through flexible conduits 30 and 30a and the suction heads 5, 5a on the carriages are exhausted through conduits 31 and 31a. All of such cables and conduits lead to appropriate supports positioned above the glass cutting apparatus and preferably thence lead to a central control station. The cables and conduits are of sufficient length to permit the unimpeded movement of the bridge and carriages throughout operative range parallel to the glass ribbon 4.

The apparatus of FIGS. 7–10, inclusive, differs from that of FIGS. 1–6, inclusive, principally in the character of the means employed to secure carriages 2' and 2a' to their respective rules 1' and 1a', so that such carriages and rules will measure correctly the length of the next panel of glass to be cut. To accomplish these functions, the apparatus is provided with the mechanisms shown in FIGS. 8, 9, and 10. Each of rules 1' and 1a' has a cross section, as shown in FIG. 8, wherein the rule has a tubular body and an elongated fin-like flange 34a projecting from the upper surface thereof. Flange 34a is provided with a plurality of equally spaced narrow vertically disposed slits 35a. Affixed to carriage 2a' on one side of the opening therethrough receiving the rule is a light source 36 which projects a narrow beam of light against and normal to the flange 34, such flange thus acting at times as a mask for the light. Affixed to carriage 2a' at a position opposite the light source and beyond the flange 34 is a photoelectric cell 37. The parts are so arranged that as the rule travels with respect to the carriage 2a', being driven, for example, by a friction wheel such as that depicted at 17, FIG. 2, engaging the lower surface of the rule, the photoelectric cell 37 generates a current pulse upon the passage of each slit 35a between the light source and the cell.

The construction just described enables each of the carriages 2' and 2a' to be positioned at respective predetermined positions, each individually, along and with respect to its corresponding rule 1' and 1a', and there releasably secured by admission of air under pressure to the respective cylinders 39, 39a. Each rule and its carriage may be moved forwardly as a unit with respect to bridge 8, by operation of a friction wheel corresponding in structure and function to wheel 17, FIG. 2.

The gripping means associated with each of carriages 2' and 2a' is illustrated in FIG. 9. As there shown, carriage 2a' is provided with a pneumatic cylinder 39a to which air under pressure is selectively fed by a flexible conduit 40a. Within carriage 2a' the rule 1a' passes between a jaw 50, fixed with the carriage and a jaw 41 fixed to the outer end of piston rod 41a of piston 41b slidably fitting cylinder 39a and which is urged against the rule when air or other fluid under pressure is admitted through conduit 40a to cylinder 39a, under control of the photoelectric means previously described, to thereby clamp the carriage to its rule.

As shown in FIG. 10, the photoelectric counting means delivers its generated impulses to an electronic counter 42. Such counter, which may be of conventional design, may be adjusted to respond only when it has received an adjustably predetermined, present number of impulses from the photoelectric scanner. When such number of impulses has been received, the counter opens an electromagnetically controlled valve 44 which is interposed in conduit 40a, thereby to subject gripping cylinder 39a to pressure as aforesaid.

The desired positioning of the carriages with respect to their respective rules may be effected as follows: Taking carriage 2a', for example, and assuming that carriage 2a' is in its limiting position at the forward end of the rule, as determined, for example, by a stop or abutment, not shown, fixed to the rule and engaging the carriage, cam 6a is released from its bolt 12a and carriage 2a is moved rearwardly toward bridge 8a until its cam 7a lockingly engages the bolt 11a on the bridge, as shown in the upper portion of FIG. 4. Assuming that the length of sheet to be cut is less than the full length provided by the rule, the rule 1a' is then released from carriage 2a' and is then caused to travel forwardly, that is, in the direction of travel of sheet 4 as indicated by arrow F in FIG. 7 by rotation of friction wheel 17a. Electronic counter 42 has been previously set for the number of impulses which will take place while rule 1a' is moving forwardly with respect to carriage 2a' from its aforesaid limiting position, to a position relatively thereto corresponding to the desired length of sheet or panel to be cut. As the rule moves forwardly, an impulse is created as each slit 35a passes in alignment with lamp 36 and cell 37 so that when the photoelectric counter has received the pre-set number of impulses, in response to travel of rule 1a', the predetermined distance to the right with respect to carriage 2a', it closes a circuit to open valve 44, thereby securing the carriage to the rule in the manner previously described. Thus the photoelectric scanner and the electronic counter cooperate to control the distance which has been subtracted from the effective length of the rule 1a' when it was in its aforesaid limiting position with respect to its carriage. When the carriage 2a' and rule 1a secured thereto are then released by disengagement of bolt 11a from cam 7a and the carriage and its rules are moved forwardly as a unit into a position corresponding to that of FIG. 3, wherein the cam 6a and bolt 12a are lockingly engaged, the position of the next transverse cut to be determined by the use of the thus adjusted rule will be correct or, in other words, carriage 2a' will then lie at a desired predetermined distance from bridge 8a, and the next cut to be made by the cutting tool will result in a panel cut from the glass ribbon of the predetermined desired length.

In the desired embodiments, the glass ribbon is shown moving in the direction F, and the carriages are shown disposed downstream of the ribbon with respect to the bridge, the carriages thereby pulling the rules. The invention may be used equally well, however, when the glass ribbon travels in a direction opposite from the arrow F; in such case the carriages will then be positioned upstream of the glass with respect to the bridge, and such carriages will exert a thrusting force on the rules.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. A method of automatically transversely cutting an elongated material in form of strip, tube or the like preferably of a glass strip moving forwardly in the direction of its length into a series of pieces of material, which comprises aligning a first measuring scale with the length of the material and causing it to travel in synchronism therewith, accurately aligning a cutting tool with a predetermined position adjacent one end of the first measuring scale while causing the tool to travel in synchronism with the material, moving the tool in a first operative scoring stroke generally transverse to the length of the material while causing it to move with the material along the path of the latter, aligning a second measuring scale with the length of the material and causing it to travel in synchronism therewith, accurately aligning a predetermined position adjacent the same end of the second measuring scale with the cutting tool while causing the tool to travel in synchronism with the material, moving the tool forwardly with respect to the material and the second measuring scale until the tool is aligned with a predetermined position on the second measuring scale spaced longitudinally of the material from the said predetermined position on the first scale, and moving the tool in a second operative scoring stroke generally transverse to the length of the material while causing it to move with the material along the path of the latter, and moving the tool forwardly with respect to the material and the first measuring scale until the tool is aligned with a predetermined second position on the first measuring scale spaced longitudinally of the material from the said predetermined position on the first scale.

2. A method as claimed in claim 1, comprising adjusting the said predetermined position on the second scale during the time that the tool is making the first operative scoring stroke.

3. A method as claimed in claim 1, wherein the same ends of the scales are selectively secured to the moving material.

4. A method of automatically transversely cutting an elongated material in form of strip, tube or the like preferably of a glass strip moving forwardly in the direction of its length into a series of pieces of material, which comprises aligning first and second measuring scales with the length of the material and causing them to travel in synchronism therewith, accurately aligning a cutting tool with a predetermined first positon adjacent one end of the first measuring scale while causing the tool to travel in synchronism with the material, moving the scoring tool in a first operative scoring stroke generally across the length of the material while causing it to move with the material along the path of the latter, moving the tool with respect to the material and the second measuring scale until the tool is aligned with a second position on the second measuring scale spaced longitudinally from the first cut made by the tool, and moving the tool in a second operative scoring stroke generally across the length of the material while causing it to move with the material along thte path of the latter.

5. A method as claimed in claim 4, wherein each time after the tool has been moved with respect to the material the tool is secured to the material to move forwardly therewith.

6. A method of automatically transversely cutting an elongated material in the form of strip, tube or the like preferably of a glass strip moving forwardly in the direction of its length into a series of pieces of material, which comprises aligning first and second measuring scales with the length of the material and causing them to travel in synchronism therewith, accurately aligning a cutting tool with a predetermined first position adjacent one end of the first measuring scale while causing the tool to travel in synchronism with the material, moving the tool in a first operative scoring stroke generally transverse to the length of the material while causing it to move with the material along the path of the latter, moving the tool with respect to the material to a position aligned with a predetermined position on the first scale, then further moving the tool with respect to the material to a position aligned with a predetermined position on the second scale, and only after such second movement of the tool moving the tool in a second operative scoring stroke generally transverse to the length of the material while causing it to move with the material along the path of the latter.

7. The method of successively cutting into sections of predetermined lengths a ribbon of glass moving in the direction of its length, by means of a scoring tool mounted for travel along a guide way transversely of the ribbon and translatable in said direction, comprising, measuring the length of each section to be cut successively by respective ones of two measuring means each individually capable of performing a measuring operation and each adapted to enter into locking engagement with the guideway before and after a measuring operation thereby, effecting relative displacement between the measuring means and the guideway, in said direction and over a predetermined distance corresponding to the required length of the section of glass to be cut, each measuring operation being carried out successively by said measuring means while the locking position corresponding to the length of the next section of glass to be cut is adjusted on the other measuring means by positioning the same in locking engagement with the guideway for the next measuring operation, moving the scoring tool along the guideway in contact with the glass to score the same transversely while the guideway is secured to the ribbon after the length of section to be cut has been measured, and releasing the guideway from the ribbon after the scoring tool has completed its movement across the ribbon.

8. The method of cutting lengths of glass from a ribbon of glass moving in the direction of its length by means of a scoring tool mounted for travel along a transverse guideway movable lengthwise of the ribbon, in which the length of glass to be cut is measured by moving the guideway for predetermined distances from first to second positions adjustable on one of successively two measuring means, each measuring operation being carried out by moving one measuring means relatively to the guideway until said guideway is aligned with a first position on said measuring means while the guideway is traveling in synchronism with the glass ribbon, causing said measuring means to travel in synchronism with the glass ribbon, moving the guideway until it is aligned with a second position on said measuring means and travels in synchronism with the glass ribbon, meanwhile moving the other measuring means relatively to the guideway until said guideway is aligned with a first position on said measuring means, causing said measuring means to travel in synchronism with the glass ribbon and moving the guideway to perform the next measuring operation, and moving the scoring tool along the guideway in contact with the glass for scoring the ribbon while the guideway is traveling in synchronism with the glass ribbon.

9. An apparatus for automatically cutting a sheet material, in particular a glass sheet, into smaller pieces of predetermined length, which comprises a plurality of carriages, means to guide the carriages for reciprocation longitudinally of the sheet, a generally transverse bridge adapted to overlie the sheet, means to mount and guide the bridge for reciprocation along the sheet parallel to the path of said carriages, a cutting tool mounted for guided movement by and along the bridge, first and second elongated measuring scales disposed parallel to the length of the sheet material, each said scale extending between a respective one of said carriages and said bridge, means to releasably secure each of the scales to its respective carriage in a selected position of adjustment therealong and to said bridge, and means selectively and independently to secure each said carriage and bridge to the sheet and to release it therefrom.

10. An apparatus as claimed in claim 9, comprising means selectively to secure each of the scales to its respective carriage at a desired position longitudinally of the scale, and means mounting said scales for movement with respect to the bridge.

11. An apparatus for automatically cutting a strip of sheet glass travelling in a path, comprising a plurality of carriages, means supporting the carriages for travel parallel to the path of travel of the glass strip, a bridge confronting a broad surface of the strip of glass, means supporting the bridge for travel parallel to the path of travel of the glass strip, a cutting tool mounted on the bridge for movement therealong and across the travelling sheet of glass, a plurality of measuring scales, each such scale being supported by its respective carriage, means selectively to secure the bridge to the strip of glass so that the bridge is directly moved by the strip, means for selectively securing each of the carriages to the strip so that each carriage is directly moved by the strip and means operable to releasably secure one end of each said scale to said bridge for movement as a unit therewith.

12. An apparatus for automatically cutting a sheet material, in particular a glass sheet, into smaller pieces of predetermined length, which comprises a carriage, means to guide the carriage for reciprocation longitudinally of the sheet, an at least generally transverse bridge adapted to overlie the sheet, means to guide the bridge for reciprocation along the sheet parallel to the path of the carriage, a cutting tool mounted for movement along the bridge, an elongated measuring scale extending between the carirage and bridge, remotely controlled gripper means to secure the scale to the carriage at a desired position longitudinally of the scale, means to releasably connect said scale to said bridge, and means to selectively and independently secure said carriage and bridge to the sheet and to release the same therefrom.

13. An apparatus as claimed in claim 12, wherein the means for securing the scale to the carriage comprises opposed gripping jaws secured to the carriage, an expansible fluid motor including a fluid-pressure cylinder for advancing the jaws relatively toward each other to grip the scale, and means to control the admission of fluid under pressure to said cylinder.

14. An apparatus as claimed in claim 13, comprising means responsive to a predetermined distance of travel of the scale with respect to the bridge for operating the means to control the admission of fluid to the gripper-operating cylinder.

15. An apparatus as claimed in claim 14, wherein the means responsive to a predetermined distance of travel of the scale with respect to the bridge comprises a first unit comprising a source of light and a photoelectric cell spaced from the source and adapted to receive light therefrom and a second unit comprising an elongated mask having a plurality of spaced apertures therealong disposed between the source of light and the photoelectric cell, one of the units being fixedly mounted on the carriage and the other of the units being mounted on the scale to travel therewith, an electric counter connected to receive electrical impulses generated by the photoelectric cell as the two units travel relatively to each other, and circuit means connecting the counter and the means to control the admission of fluid to the cylinder, whereby the gripper clamps the scale upon the reception of a predetermined number of electrical impulses by the counter.

16. An apparatus as claimed in claim 15, wherein the first unit is mounted on the bridge and the second unit is mounted on the scale.

17. In an apparatus for cutting lengths of glass from a ribbon of glass moving in the direction of its length, a guideway disposed over and transversely of the path of the ribbon and movable in said direction, first and second measuring means each independently securable to the ribbon and means operable selectively to lock each said measuring means to said guideway when the same has moved away from said guideway a predetermined distance corresponding to the required length of glass to be cut.

18. In an apparatus for successively severing into predetermined lengths, a ribbon of glass moving in the direction of its length, a bridge extending transversely across the sheet and independently movable in said direction, means carried by said bridge for releasably securing it to the sheet, first and second carriages each mounted adjacent the sheet for independent movement in said direction, means carried by each said carriage for releasably securing it to the sheet, first and second rules extending in said direction and each slidably associated with a respective one of said carriages and with said bridge, and means operable to releasably and selectively connect each said rule with said bridge.

19. The apparatus of claim 18, and means operable to releasably secure each said carriage to its said rule, in a selected position of length adjustment therealong.

References Cited in the file of this patent

UNITED STATES PATENTS

| | | |
|---|---|---|
| 1,710,898 | Rowley | Apr. 30, 1929 |
| 1,720,546 | Drake | July 9, 1929 |
| 1,853,498 | Bliven | Apr. 12, 1932 |
| 2,058,307 | Gaskell | Oct. 20, 1936 |
| 2,323,686 | Sommerfeld | July 6, 1943 |
| 2,530,511 | Danner | Nov. 21, 1950 |
| 2,747,280 | Kurata | May 29, 1956 |
| 2,943,393 | Insolo | July 5, 1960 |
| 2,964,848 | Gonsalves | Dec. 20, 1960 |
| 2,994,000 | Schoppelrey | July 25, 1961 |
| 3,081,657 | Harris | Mar. 19, 1963 |
| 3,097,789 | Kassel et al. | July 16, 1963 |